(12) United States Patent
Wolf-Monheim

(10) Patent No.: US 10,807,462 B2
(45) Date of Patent: Oct. 20, 2020

(54) AXLE ASSEMBLY

(71) Applicant: FORD GLOBAL TECHNOLOGIES, LLC, Dearborn, MI (US)

(72) Inventor: Friedrich Wolf-Monheim, Aachen NRW (DE)

(73) Assignee: FORD GLOBAL TECHNOLOGIES, LLC, Southfield, MI (US)

( * ) Notice: Subject to any disclaimer, the term of this patent is extended or adjusted under 35 U.S.C. 154(b) by 0 days.

(21) Appl. No.: 16/456,699

(22) Filed: Jun. 28, 2019

(65) Prior Publication Data

US 2020/0001700 A1 Jan. 2, 2020

(30) Foreign Application Priority Data

Jun. 28, 2018 (DE) .......................... 10 2018 210 626

(51) Int. Cl.
*B60K 7/00* (2006.01)
*B60K 17/22* (2006.01)
(Continued)

(52) U.S. Cl.
CPC .............. *B60K 7/0007* (2013.01); *B60K 1/04* (2013.01); *B60K 17/043* (2013.01); *F16H 7/02* (2013.01);
(Continued)

(58) Field of Classification Search
CPC .......... B60K 7/0007; B60K 7/00; B60K 1/04; B60K 17/043; B60K 6/40; B60K 2001/045; F16H 7/02; F16H 7/06
(Continued)

(56) References Cited

U.S. PATENT DOCUMENTS 5,390,753 A * 2/1995 Parker .................... A61G 5/045
180/19.1
6,390,216 B1 * 5/2002 Sueshige ................ B60L 50/66
180/65.51
(Continued)

FOREIGN PATENT DOCUMENTS

CN 2840491 Y 11/2006
CN 201264517 Y 7/2009
(Continued)

OTHER PUBLICATIONS

Pruckner, Alfred et al. Vehicle Dynamics per Software—Potential of an Electric Single Wheel Drive. Conference on Future Automotive Technology. pp. 147-165. 2013. 18 pages.

*Primary Examiner* — John D Walters
(74) *Attorney, Agent, or Firm* — Brooks Kushman P.C.; David Kelley

(57) ABSTRACT

An axle assembly includes a first wheel connected in a rotationally fixed manner to a first wheel shaft with a wheel hub motor and a second wheel connected in a rotationally fixed manner to a second wheel shaft. The second wheel is coupled by a mechanical transmission mechanism in a driving manner to the wheel hub motor. The transmission mechanism has a transmission shaft unit which extends generally parallel to, but non-coaxially with the wheel shafts such that the transmission shaft unit is offset in the vehicle longitudinal direction from the wheel shafts and is coupled via coupling units in a force-transmitting manner on one hand to the wheel hub motor and on the other hand to the second wheel to provide drive force to both wheels from a single wheel hub motor at least partially containing within one of the wheel hubs.

20 Claims, 2 Drawing Sheets

(51) Int. Cl.
  *B60K 1/04*    (2019.01)
  *B60K 17/04*   (2006.01)
  *F16H 7/02*    (2006.01)
  *F16H 7/06*    (2006.01)
  *B60K 6/40*    (2007.10)
(52) U.S. Cl.
  CPC .................. *F16H 7/06* (2013.01); *B60K 6/40* (2013.01); *B60K 2001/045* (2013.01); *B60Y 2200/91* (2013.01); *B60Y 2200/92* (2013.01)
(58) Field of Classification Search
  USPC ...................................................... 180/65.51
  See application file for complete search history.

(56) References Cited

U.S. PATENT DOCUMENTS

| | | | |
|---|---|---|---|
| 10,065,500 B2* | 9/2018 | Higuchi | B60K 17/356 |
| 2005/0052080 A1 | 3/2005 | Maslov et al. | |
| 2017/0305681 A1* | 10/2017 | Kramble | B65G 41/008 |

FOREIGN PATENT DOCUMENTS

| | | |
|---|---|---|
| CN | 103895483 A | 7/2014 |
| EP | 1386815 A2 | 2/2004 |

* cited by examiner

AXLE ASSEMBLY

CROSS-REFERENCE TO RELATED APPLICATIONS

This application claims foreign priority benefits under 35 U.S.C. § 119(a)-(d) to DE Application 10 2018 210 626.6 filed Jun. 28, 2018, which is hereby incorporated by reference in its entirety.

TECHNICAL FIELD

The disclosure relates to an axle assembly configured to accommodate a single in-wheel electric motor for propelling a motor vehicle.

BACKGROUND

In the case of a traditional drive concept of a motor vehicle, the drive force is generated by a motor accommodated in the vehicle structure and transmitted via various transmission components to the drive wheels. This concept is known both in the case of pure internal combustion engines and in the case of electric drives or hybrid drives. In addition to the transmission of the drive force, a step-up or step-down is generally also carried out. In the case of a widened design, for example, the motor is accommodated as a front motor together with a transmission in a front part of the vehicle structure, from where the drive force is transmitted to the rear wheels via a drive shaft running in the longitudinal direction. In addition, however, drive wheels with (electric) wheel hub motors are also known in the case of electric vehicles and hybrid vehicles. In the case of a wheel hub motor, the motor is assigned directly to the respective drive wheel and is at least partially, normally entirely in it. The drive force can thus be transmitted to the wheel without interposing a transmission. In comparison with a traditional drivetrain, the drive is characterized by a substantially more compact design by means of a wheel hub motor. The mass of the vehicle can also furthermore generally be reduced since various transmission components can be omitted.

One problem arises nevertheless in terms of the drive in the case of a two-wheel axle. On one hand, it is possible to provide both wheels individually in each case with a wheel hub motor. This enables the omission of any components for the transmission of force and also enables entirely independent setting of the rotational speed and of the torque at both wheels. On the other hand, as a result of the two motors, the mass of the vehicle and in particular the production costs are increased. In addition to this, drive concepts have also already been proposed in the case of which only one of the wheels has a wheel hub motor and the opposite wheel is also driven via a transversely running axle shaft or optionally with interposing a differential transmission.

CN 201264517 Y discloses a two-wheel rear axle for a solar vehicle. According to one embodiment, one of the wheels has a wheel hub motor, in the case of which a rotor co-rotates with the rim, while a stator is connected in a rotationally fixed manner to a first axle portion which is coupled via a bevel gear differential transmission to a second axle portion to which the rim of the second wheel is connected in a rotationally fixed manner.

A similar drive is known from CN 2840491 Y. However, in this case, a more powerful motor is installed in one of the wheels and a weaker motor is installed in the other wheel. Depending on the current requirement, the weaker, the more powerful or both motors can be operated simultaneously.

U.S. Pat. No. 6,390,216 B1 discloses a three-wheel vehicle with electric drive. In the case of some embodiments, the wheels of the rear axle are connected to one another by a straight axle shaft and an electric motor is integrated into one of the wheels. This also drives the opposite wheel via the axle shaft. The latter can optionally receive batteries which serve as energy stores to operate the motor. Other embodiments provide that both wheels are driven independently by respectively integrated electric motors.

US 2005/0052080 A1 shows a four-wheel electric vehicle, in the case of which each of the wheels is driven independently by a wheel hub motor. It is emphasized in this case that any mechanical transmission components are omitted and that, in the event of failure of one of the motors, the vehicle can still be operated with the remaining motors.

An electric vehicle with in each case two-wheel front and rear axles is shown in CN 103895483 A. At each of the axles, only one wheel is driven by an electric motor which acts on an axle shaft connected to the wheel. The respective other wheel of the axle is not driven. Operation of the vehicle should be enabled as a result of the driving at the front and rear axle even in the event of failure of one of the motors.

EP 1 386 815 A2 discloses a single wheel drive unit of an electrically driven vehicle, in particular a rail vehicle. This has an electric motor, the motor shaft of which is arranged substantially normally to the wheel axle and which drives a single wheel, wherein a transmission is arranged between electric motor and single wheel. The electric motor is a fan-free, air-cooled electric motor, the cooling of which is carried via the outer surface. In the case of one shown exemplary embodiment, a coupling of the motor shaft to the axle of the single wheel via a bevel gear transmission is shown.

In view of the highlighted prior art, there is still much room for improvement in the provision of an optimized, in particular low-cost drive concept for an electric or hybrid vehicle.

SUMMARY

Embodiments according to the disclosure provide an optimized drive for an electric or hybrid vehicle.

It should be pointed out that the features and measures listed individually in the following description can be combined with one another in any desired, technically expedient manner and highlight further configurations of the invention. The description characterizes and specifies the invention in particular additionally in conjunction with the figures.

An axle assembly according to various embodiments is normally provided for a motor vehicle such as a car or HGV, more precisely for an electric vehicle or hybrid vehicle. The axle assembly could also be used, for example, on a trailer or semitrailer which has its own drive. This normally involves an axle assembly for a non-steering axle, in particular a rear axle.

In one or more embodiments, the axle assembly has a first wheel which is connected in a rotationally fixed manner to a first wheel shaft with a wheel hub motor and a second wheel which is connected in a rotationally fixed manner to a second wheel shaft, which second wheel is coupled by a mechanical transmission mechanism in a driving manner to the wheel hub motor. Each of the wheels is connected in a rotationally fixed manner to the wheel shaft associated with it. Each wheel or the respective wheel shaft associated with it is of course rotatably mounted, for example, in a wheel carrier. The first and second wheel are thus rotatably mounted about a first and second axis of rotation, wherein the two axes of rotation can correspond to one another at least temporarily or an axis of rotation can change the elongation of the other. The first and the second wheel are arranged in the Y-direction or along the Y-axis (transverse axis) on different sides of the motor vehicle. All of the references to the X-axis, Y-axis and Z-axis of the vehicle refer here and below to the properly installed state of the axle assembly. The designations "first wheel" and "second wheel" do not in this case imply a sequence, i.e. each of the two wheels can be either the left or the right wheel. The first wheel has a wheel hub motor, i.e. an electric motor, which is at least partially integrated into the first wheel. In so far as the first wheel is connected in a rotationally fixed manner to the first wheel shaft, the wheel hub motor is normally formed as an internal rotor, i.e. the rotor is surrounded by the stator. The first wheel can be driven by the wheel hub motor. For the supply of power, the wheel hub motor is, in the assembled state, connected to at least one generator or at least one battery which is normally not arranged directly on the first wheel or in its vicinity.

In addition to the drive of the first wheel, it is provided that the wheel hub motor also drives the second wheel. To this end, the second wheel is coupled via the mechanical transmission mechanism in a driving manner to the wheel hub motor. The transmission mechanism is formed for mechanical transmission of a drive force or a drive torque from the wheel hub motor to the second wheel. This fundamentally includes the possibility that the force or the torque can not only be transmitted, rather can also be changed, for example, by a step down or step up. It is normally provided that only the first wheel has a wheel hub motor so that driving on both sides is achieved with only one wheel hub motor. In other words, although the wheel hub motor which serves the purpose of driving is only localized in the first wheel, a drive of the vehicle is achieved via both wheels. Since a second wheel hub motor for the second wheel can be omitted, the axle assembly according to the invention can be realized in a low-cost and weight-saving manner.

According to various embodiments, the transmission mechanism has a transmission shaft unit which extends in the Y-direction, is offset transverse to the Y-direction with respect to the wheel shafts and is coupled via coupling units in a force-transmitting manner on one hand to the wheel hub motor and on the other hand to the second wheel. The transmission shaft unit extends in the Y-direction, i.e. along the Y-axis. In particular, it can run parallel to the Y-axis and parallel to the wheel shafts. The designation "transmission shaft unit" shows that it is configured for the transmission of force. The transmission shaft unit normally has at least one transmission shaft which extends in the Y-direction and runs, where applicable, parallel to the Y-axis. Where applicable, several transmission shafts can also be provided which are connected to one another, for example, via a cardan joint, a differential transmission or other elements.

The transmission shaft unit can extend in particular so far from one side of the motor vehicle to the other side that it intersects with both wheel shafts in relation to the Y-axis or overlaps with these. However, it does not run coaxially with respect to the wheel shafts, rather is offset from these transverse to the Y-direction. In order to balance out this offset, coupling units are provided via which the transmission shaft unit is coupled in a force-transmitting manner to the wheel hub motor and to the second wheel. In terms of the coupling units, which are of course also formed purely mechanically, there are various possibilities, of which some are explained below. In any case, as a result of the offset of the transmission shaft unit transverse to the Y-axis, a space is provided between the two wheel shafts which is not occupied by the transmission shaft unit and thus can be, for example, left free or in which any desired parts of the vehicle can be arranged.

The transmission shaft unit is preferably offset with respect to the wheel shafts in the X-direction. This expressly includes the possibility that the transmission shaft unit is additionally offset in the Z-direction. In any case, it can be achieved by an offset in the X-direction that the space between the wheel shafts as well as (in the Z-direction) thereabove or thereunder is not occupied by the transmission shaft unit. It is thus, for example, possible to arrange one or more components at least partially between the wheel shafts without the installation height of the corresponding components being restricted by the transmission shaft unit.

At least one coupling unit advantageously has a transmission element which is self-contained in a loop-like manner and is coupled on one hand to the transmission shaft unit and on the other hand to a wheel shaft. The transmission element is self-contained in a loop-like or annular manner. It is guided on one hand on sides of the transmission shaft unit and on the other hand on sides of the wheel shaft around in each case a shaft, as a result of which a rotational movement is transmitted between the two shafts. One example of such a transmission element would be an annularly closed chain which engages on both sides with in each case one gear wheel and thus forms a chain drive. It will be obvious that, in addition to a pure transmission of the rotational movement, a step down or step up can also optionally be realized by means of such a transmission element.

The transmission element may be coupled directly to the wheel shaft and to the transmission shaft unit. In this case, the transmission element runs on one hand around the transmission shaft unit and on the other hand the wheel shaft. A tangential transmission of force which is achieved at least by a frictional connection, normally, however, by positive locking, is performed at each of the shafts. In the latter case, one can say that the transmission element engages on one hand with the transmission shaft unit and on the other hand with the wheel shaft. For example, a coupling on via a gear wheel or a belt pulley which is connected in a rotationally fixed manner to the respective shaft is also regarded as direct coupling.

The transmission element is preferably formed as a belt drive. Such a belt drive can be formed in various ways, for example, as a flat belt, V-belt or round belt. Since significant drive forces generally have to be transmitted and slip is to be avoided, the drive belt can preferably be formed as a toothed belt. In this case, in each case a gear wheel, with which the toothed belt engages, is arranged on sides of the wheel shaft and on sides of the transmission shaft unit. In comparison with an alternatively conceivable chain drive, the drive belt has on one hand the advantage that no cleaning or lubrication is necessary in order to maintain its functionality. On the other hand, the drive belt can have a certain degree of elasticity, as a result of which—to a certain extent—changes in the distance between the transmission shaft unit and the wheel shaft can be balanced out.

As already mentioned, the transmission shaft can have several shafts coupled to one another, for example, via a cardan joint, a differential transmission or other elements. In terms of a low-cost, simple structure, the transmission shaft unit can nevertheless preferably be formed as a one-piece transmission shaft. I.e. this involves a single transmission shaft which extends in the Y-direction, is offset transverse to the Y-direction with respect to the wheel shafts and is coupled via coupling units in a force-transmitting manner on one hand to the wheel hub motor and on the other hand to the second wheel. In many cases, this simple configuration is absolutely adequate, with which low material costs and a simplified assembly are achieved. This design can furthermore have a positive effect on the overall mass and the overall weight.

In the case of the axle assembly according to one or more embodiments, a suspension of the wheels can advantageously also be provided. Wheels may be mounted in a deflectable manner independently of the transmission shaft unit with respect to a vehicle structure. In other words, each wheel shaft is deflectable independently of the transmission shaft unit with respect to the vehicle structure. Deflectability is indicated at least partially in the Z-direction. The designation "vehicle structure" serves in this case as a collective term for the vehicle body, the chassis and optionally an auxiliary frame. The respective wheel shaft can be mounted rotatably in a wheel carrier as already mentioned above. Since the deflection of the wheels is independent of the transmission shaft unit, the distance between the respective wheel shaft and the transmission shaft unit can vary depending on the degree of deflection. In this case, the changing distance must be balanced out by the coupling unit, which is possible, for example, by means of an elastic drive belt mentioned above. One or more spring elements (e.g. a leaf spring or a helical spring) and/or shock absorber can be assigned to each of the wheels. Such an element can be supported, for example, on one hand on the vehicle structure and on the other hand on the wheel carrier.

The wheels may be mounted in a deflectable manner independently of one another with respect to the vehicle structure. In this case, a single wheel suspension is thus present. In so far as the respective wheel is mounted via a wheel carrier, the corresponding wheel carrier can be connected to the vehicle structure via at least one, normally several connecting rods. Various types of connecting rods, for example, longitudinal connecting rods, oblique connecting rods and/or transverse connecting rods are possible in this case.

According to one configuration, the transmission shaft unit is mounted in a stationary manner on the vehicle structure. In other words, the transmission shaft unit is mounted on the vehicle structure via at least one stationary rotary bearing. This means, in the presence of a suspension, automatically that the transmission shaft unit is part of the sprung mass, i.e. it does not follow the movements of the wheels during compression with respect to the vehicle structure, but rather remains stationary with respect thereto.

In the case of the axle assembly according to one or more embodiments, the drive force of the second wheel is provided by the wheel hub motor of the first wheel. As a result of this, installation space is produced within the second wheel, which installation space can either remain free or can be used to accommodate various elements. In particular, at least one battery can be arranged in the second wheel. The at least one battery, which is of course normally formed as an accumulator, can preferably be connected electrically to the wheel hub motor. I.e. it serves here on one hand as an energy source for the wheel hub motor, on the other hand, however, energy can also be supplied from the wheel hub motor into the at least one battery if the wheel hub motor is operated as a generator, i.e. energy is recuperated.

Further advantageous details and effects are explained in greater detail below on the basis of a representative embodiment represented in the figures.

DETAILED DESCRIPTION

As required, detailed embodiments are disclosed herein; however, it is to be understood that the disclosed embodiments are merely representative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Identical parts are provided with the same reference numbers in the various figures, and therefore generally only described once.

Figure 1:
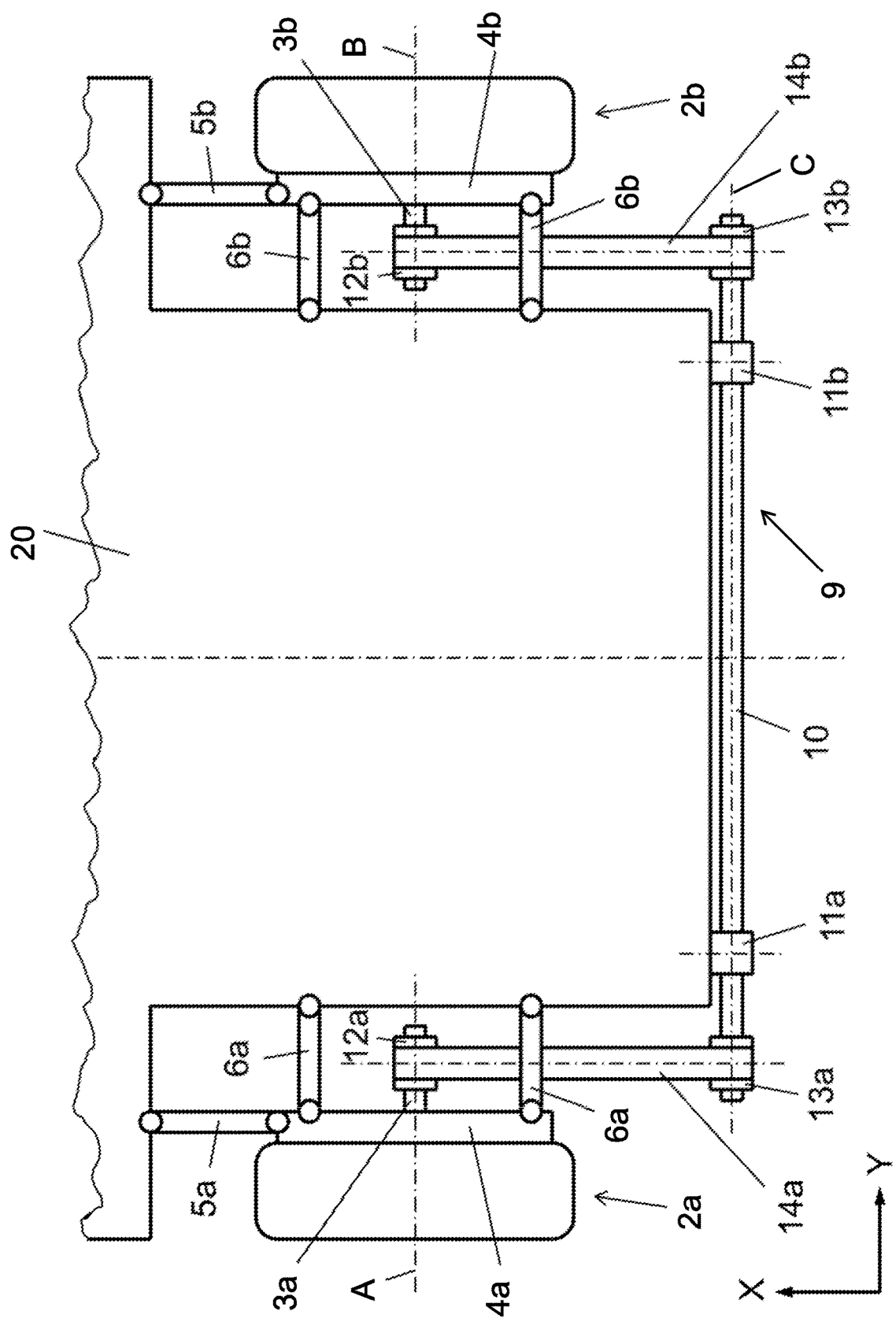
FIG. 1 shows a top view of an axle assembly according to a representative embodiment.
Figure 2:
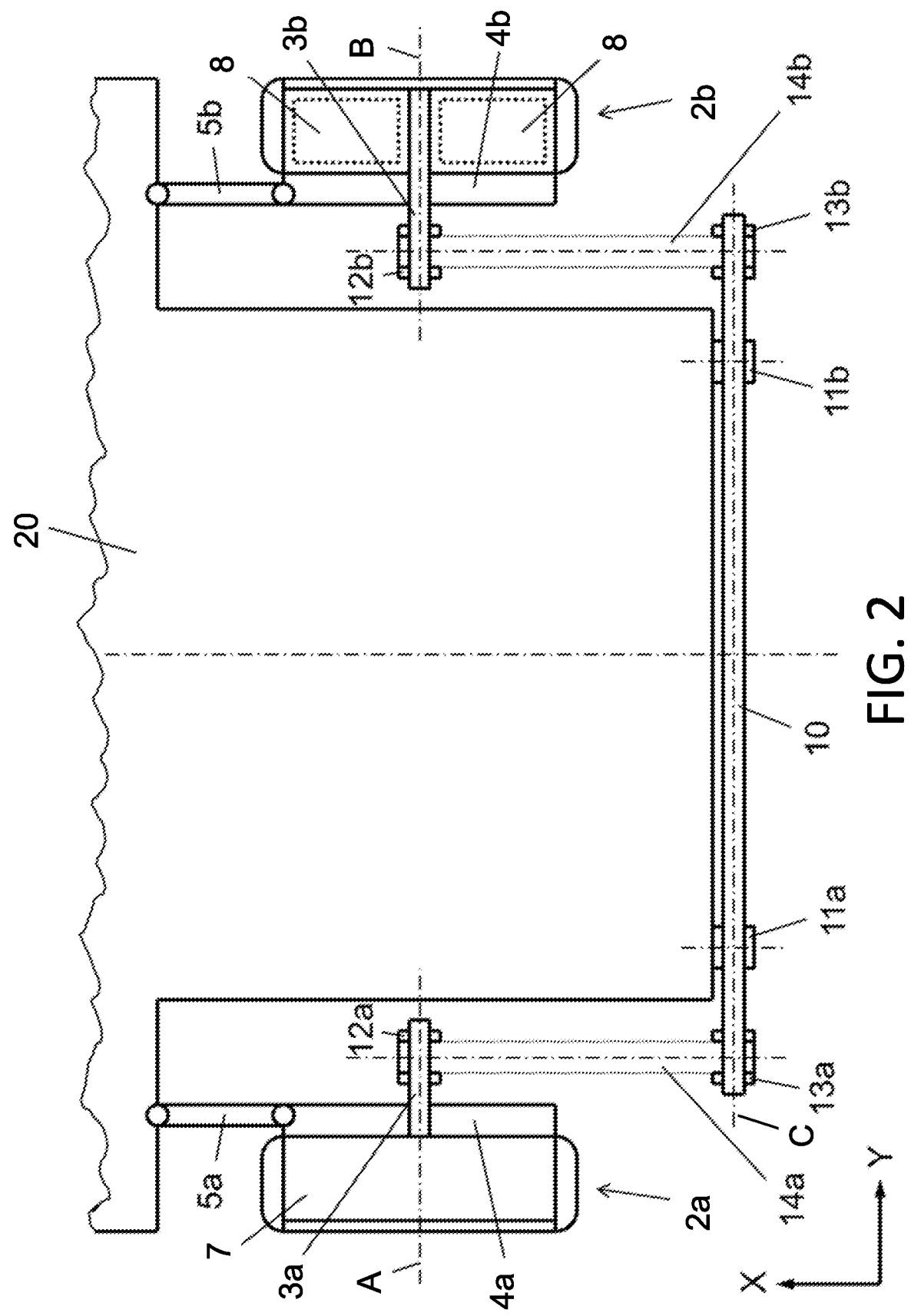
FIG. 2 shows a sectional representation of the axle assembly from FIG. 1.

FIGS. 1 and 2 show various views of an axle assembly 1 according to one or more embodiments which can be used for an electric or hybrid vehicle, e.g. a car or HGV.

A first wheel 2a and a second wheel 2b which are arranged on both sides of a vehicle structure 20 are apparent. First wheel 2a is connected in a rotationally fixed manner to a first wheel shaft 3a, while second wheel 2b is connected in a rotationally fixed manner to a second wheel shaft 3b. Each of wheel shafts 3a, 3b is rotatably mounted in a wheel carrier 4a, 4b, as a result of which a first axis of rotation A and a second axis of rotation B are defined which run parallel to the Y-axis. Wheel carrier 4a, 4b is connected via longitudinal connecting rods 5a, 5b and transverse connecting rods 6a, 6b to vehicle structure 20. As a result of this, wheel carriers 4a, 4b and wheels 2a, 2b connected thereto are deflectable independently of one another with respect to vehicle structure 20. At least one spring element and one shock absorber are normally assigned to each of wheels 2a, 2b, which spring element and shock absorber were omitted here on the grounds of clarity.

First wheel 2a has an electrically operable wheel hub motor 7 (apparent in the sectional representation in FIG. 2) which is integrated into first wheel 2a. Wheel hub motor 7 is formed as an internal rotor, wherein the stator is connected to wheel carrier 4a, while the internal rotor acts on wheel shaft 3. Second wheel 2b does not have a wheel hub motor; for this, one or more accumulators 8 can optionally be received in it, which accumulators 8 can be electrically connected, for example, to wheel hub motor 7 to discharge energy to it or—during recuperation or regeneration—take up energy from wheel hub motor 7. Installation space within vehicle structure 20 is saved by the accommodation of accumulators 8 in second wheel 2b.

Respective wheel shafts 3a, 3b are formed to be comparatively short and extend only a small distance inward along the Y-axis. To realize a transmission of the drive force of wheel hub motor 7 to second wheel 2b, these are coupled to one another via a transmission mechanism 9. Transmission mechanism 9 has a transmission shaft 10 which runs parallel to the Y-axis and which is mounted on vehicle structure 20 by means of two stationary rotary bearings 11a, 11b, as a result of which a third axis of rotation C is defined. In general, transmission shaft 10 is offset to the rear in the X-direction with respect to wheel shafts 3a, 3b. Additionally, it can optionally be offset in the Z-direction. As a result of the offset arrangement, a space is provided along the Y-axis between the two wheel shafts 3a, 3b which is not occupied by transmission shaft 10 and which it avoids to a certain extent. This can be used, for example, as installation space for various components of the vehicle.

To enable the transmission of force between transmission shaft 10 and wheel hub motor 7 on one hand and second wheel 2b on the other hand, 2 coupling units are provided. These are of the same type of configuration in the present example. In each case a front belt pulley 12a, 12b is formed at each wheel shaft 3a, 3b, the position of which belt pulley along the Y-axis coincides with the position of a rear belt pulley 13a, 13b on transmission shaft 10. Belt pulleys 12a, 12b, 13a, 13b are in each case connected in a rotationally fixed manner to associated shaft 3a, 3b, 10 and can optionally also be manufactured in one piece with it. In each case one drive belt 14a, 14b interacts with a front belt pulley 12a, 12b and with a rear belt pulley 13a, 13b. Drive belt 14a, 14b can be formed in various manners, for example, as a V-belt or as a toothed belt. The form of respective belt pulley 12a, 12b, 13a, 13b is of course adapted to the form of drive belt 14a, 14b. In any case, a transmission of a drive force or a drive torque is performed by a frictional connection and, where applicable, by positive locking. In the operating state, the flow of force runs from wheel hub motor 7 via first wheel shaft 3a and its associated belt pulley 12a as well as via first drive belt 14a to a first rear belt pulley 13a. The flow of force further leads through transmission shaft 10 and a second rear belt pulley 13b via second drive belt 14b to second front belt pulley 12b and thus to second wheel shaft 3b of second wheel 2b.

As already explained, wheel carriers 4a, 4b can deflect with wheels 2a, 2b arranged thereon with respect to vehicle structure 20, while transmission shaft 10 is mounted in a stationary manner on vehicle structure 20. Changes in the distances between respective wheel shaft 3a, 3b and transmission shaft 10 therefore arise during deflection. However, since drive belts 14a, 14b have a certain degree of elasticity, these changes in distance can be compensated.

While representative embodiments are described above, it is not intended that these embodiments describe all possible forms of the invention. Rather, the words used in the specification are words of description rather than limitation, and it is understood that various changes may be made without departing from the spirit and scope of the claimed subject matter. Additionally, the features of various implementing embodiments may be combined to form further embodiments that may not be explicitly illustrated or described.

What is claimed is:

1. A vehicle axle assembly having a first wheel connected in a rotationally fixed manner to a first wheel shaft with a wheel hub motor at least partially contained therein and a second wheel connected in a rotationally fixed manner to a second wheel shaft, comprising:
   a mechanical transmission mechanism coupling the second wheel in a driving manner to the wheel hub motor, wherein the transmission mechanism comprises a transmission shaft extending generally parallel to the first and second wheel shafts and offset in a vehicle longitudinal direction relative to the first and second wheel shafts;
   a first coupling unit coupling the transmission shaft in a force transmitting manner to the wheel hub motor; and
   a second coupling unit coupling the transmission shaft in a force transmitting manner to the second wheel.

2. The vehicle axle assembly of claim 1, wherein the transmission shaft is offset from the first and second wheel shafts in a vertical direction.

3. The vehicle axle assembly of claim 1 wherein at least one of the first and second coupling units comprises a self-contained transmission element coupled to the transmission shaft and one of the first and second wheel shafts.

4. The vehicle axle assembly of claim 3 wherein the transmission element is coupled directly to one of the first and second wheel shafts and to the transmission shaft.

5. The vehicle axle assembly of claim 4 wherein the transmission element comprises a drive belt.

6. The vehicle axle assembly of claim 4 wherein the transmission element comprises a drive chain.

7. The vehicle axle assembly of claim 4 wherein the transmission shaft comprises a one-piece transmission shaft.

8. The vehicle axle assembly of claim 1 wherein the wheels are mounted in a deflectable manner independently of the transmission shaft with respect to a vehicle chassis or frame.

9. The vehicle axle assembly of claim 1 further comprising a battery arranged in the second wheel and electrically coupled to the wheel hub motor.

10. The vehicle axle assembly of claim 1 further comprising:
    a first pulley coupled to the first wheel shaft;
    a second pulley secured for rotation with a first end of the transmission shaft;
    a third pulley secured for rotation with a second end of the transmission shaft;
    a fourth pulley coupled to the second wheel shaft;
    a first drive element coupling the first and second pulleys; and
    a second drive element coupling the third and fourth pulleys.

11. The vehicle axle assembly of claim 10 wherein the first and second drive elements comprise drive belts.

12. The vehicle axle assembly of claim 10 wherein the first and second drive elements comprise drive chains.

13. A vehicle comprising:
    a first wheel connected to a first wheel shaft;
    only one wheel hub motor, the wheel hub motor at least partially contained within the first wheel;
    a second wheel connected to a second wheel shaft;
    a transmission shaft rotationally secured to a vehicle structure, the transmission shaft extending generally parallel and non-coaxial with the first and second wheel shafts;
    a first coupling unit coupling the transmission shaft to the wheel hub motor; and
    a second coupling unit coupling the transmission shaft to the second wheel shaft.

14. The vehicle of claim 13 wherein the transmission shaft is offset in a vertical direction relative to the first and second wheel shafts.

15. The vehicle of claim 14 wherein the transmission shaft is offset in a horizontal direction relative to the first and second wheel shafts.

16. The vehicle of claim 15 wherein the first and second coupling units each comprise first and second pulleys coupled by an associated drive element.

17. The vehicle of claim 16 wherein the drive element comprises a belt.

18. The vehicle of claim 17 further comprising a battery electrically coupled to the hub motor and positioned within the second wheel.

19. A vehicle comprising:
- a first wheel connected to a first wheel shaft;
- a hub motor at least partially contained within the first wheel and coupled to the first wheel shaft;
- a second wheel connected to a second wheel shaft;
- a transmission shaft rotationally secured to a vehicle frame or chassis, the transmission shaft extending non-coaxially relative to the first and second wheel shafts;
- wherein the transmission shaft is coupled to the hub motor and the second wheel shaft to provide driving force from the hub motor to the second wheel shaft.

20. The vehicle of claim 19 wherein the transmission shaft is offset in a vehicle longitudinal direction relative to the first and second wheel shafts, the vehicle further comprising a plurality of pulleys and a plurality of drive belts or drive chains configured to couple the transmission shaft to the first and second wheel shafts.

* * * * *